United States Patent [19]

Esashi et al.

[11] 3,802,647

[45] Apr. 9, 1974

[54] TAPE CASSETTE

[75] Inventors: Hanjiro Esashi, Sendai; Katsuyoshi Kawamata, Shiogama, both of Japan

[73] Assignee: Sony Corporation, Tokyo, Japan

[22] Filed: Mar. 22, 1972

[21] Appl. No.: 236,888

[30] Foreign Application Priority Data

Mar. 31, 1971 Japan .............................. 46-23911

[52] U.S. Cl. ............................... 242/199, 242/71.2

[51] Int. Cl. ......................................... G11b 23/10

[58] Field of Search .......... 242/199, 200, 198, 197, 242/194, 71.1, 71.2, 210; 352/72, 78; 274/4 B, 4 C, 11 B, 11 C; 179/100.2 Z, 100.2 ZA

[56] References Cited

UNITED STATES PATENTS

| | | | |
|---|---|---|---|
| 3,075,717 | 1/1963 | Kingston | 242/200 |
| 3,140,832 | 7/1964 | Cech | 242/199 |

FOREIGN PATENTS OR APPLICATIONS

| | | | |
|---|---|---|---|
| 1,070,348 | 6/1967 | Great Britain | 352/78 R |

*Primary Examiner*—George F. Mautz
*Attorney, Agent, or Firm*—Lewis H. Eslinger, Esq.; Alvin Sinderbrand, Esq.

[57] ABSTRACT

In a magnetic tape cassette having two tape reels rotatable in side-by-side relation within a casing with one of the reels having a flange only at the upper end of its hub and the other reel having a flange only at the lower end of its hub, tape guides in the casing for guiding the tape between the reels, and a raised portion on the upper surface of the casing bottom wall which is at least substantially coextensive with the flange at the upper hub end of said one reel; such raised portion is provided with a depression which extends over the range of the paths followed by the tape between the tape guides and said one reel for the conditions of maximum and minimum winding of the tape on that one reel. The reels may be laterally located with respect to each other so that the flanges thereof are in overlapping relation.

3 Claims, 6 Drawing Figures

TAPE CASSETTE

This invention relates generally to magnetic tape cassettes, and more particularly is directed to improvements in tape cassettes of the type in which the magnetic tape is wound on rotatable supply and take-up reels which are disposed in side-by-side relation within a casing or housing, and which each have only a single flange extending from the upper end or the lower end of the respective reel hub so that the reels can be laterally disposed with their flanges in overlapping relation for minimizing the size of the cassette casing, for example, as disclosed in U.S. Pat. Application Ser. No. 193,753, filed Oct. 29, 1971, by Katsu Inaga, and having a common assignee herewith.

In the magnetic tape cassette disclosed in the above identified application, the bottom wall of the cassette casing has its upper surface formed with a raised portion which is at least substantially coextensive with the flange of the reel, preferably the take-up reel, having such flange at the upper end of its hub so that such raised portion and the flange of the take-up reel cooperate in limiting displacements of the tape in the axial direction of the take-up reel as the tape is wound on, or unwound from the hub of that reel. Further, the raised portion of the casing bottom wall is covered with a layer of smooth low-friction material.

In the above described magnetic tape cassette, the lower edge of the tape extending between the take-up reel and the tape guide members which guide the tape between the reels rubs upon the raised portion of the casing bottom wall during winding and unwinding of the tape on the take-up reel. As a result of that rubbing action, a frictional drag is applied to the lower edge of the tape. Even though such frictional drag is reduced by the layer of smooth low-friction material covering the raised portion of the casing bottom wall, the reduced frictional drag is still sufficient to set up a vibration in the tape which, during the reproduction of signals on the tape, adversely affects the fidelity of such reproduction. More specifically, when video signals are recorded on the tape, the vibration of the tape caused by the frictional drag on its lower edge results in jitter of the displayed pictures corresponding to the signals reproduced from the tape.

Accordingly, it is an object of this invention to provide a magnetic tape cassette as described above, but in which the application of a frictional drag to the lower edge of the tape between the guide members and the take-up reel is substantially avoided so as to eliminate the problems mentioned in connection with such drag.

In accordance with an aspect of this invention, a magnetic tape cassette, as aforesaid, is provided with a depression in the raised portion of its casing bottom wall, which depression extends over the range of the paths followed by the tape between the take-up reel and the adjacent tape guide member for the conditions of maximum and minimum winding of the tape on the take-up reel, whereby the lower edge of the tape is substantially free of the casing bottom wall in all of such paths to avoid the application of the undesirable frictional drag to said lower edge.

The above, and other objects, features and advantages of this invention, will be apparent in the following detailed description of an illustrative embodiment thereof which is to be read in connection with the accompanying drawings, wherein.

Figure 4:
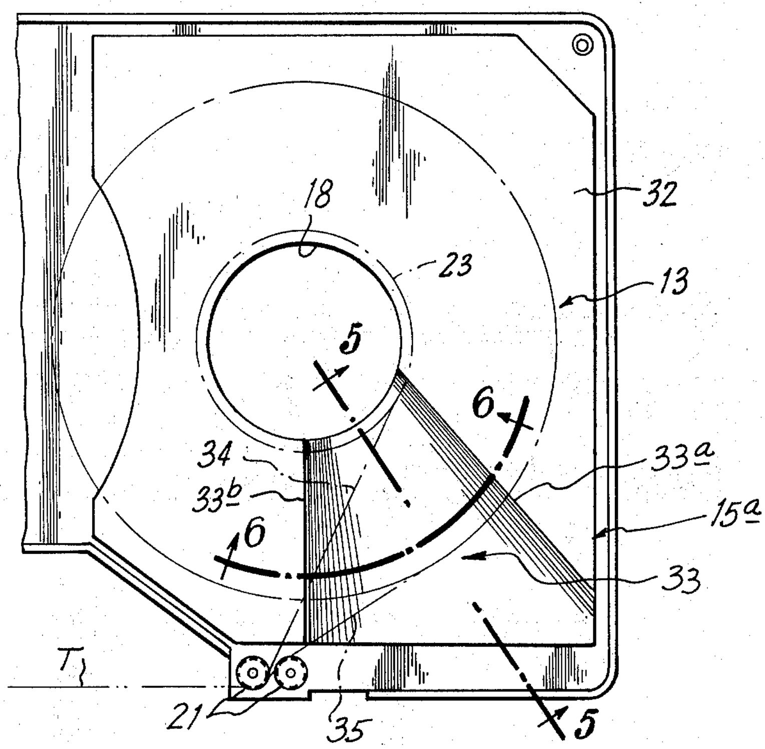
Figure 5:
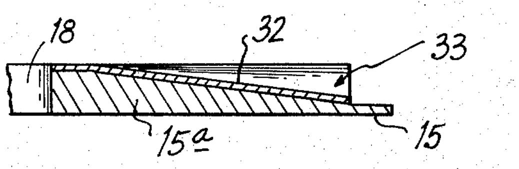
Figure 6:
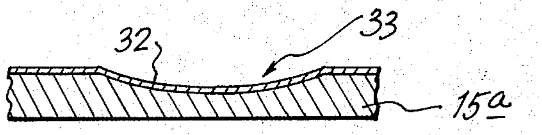

FIG. 4 is a fragmentary plan view of a portion of the upper surface of the casing bottom wall in the cassette according to this invention; and FIGS. 5 and 6 are detail sectional views taken along the lines 5—5 and 6—6, respectively, on FIG. 4.

Figure 1:
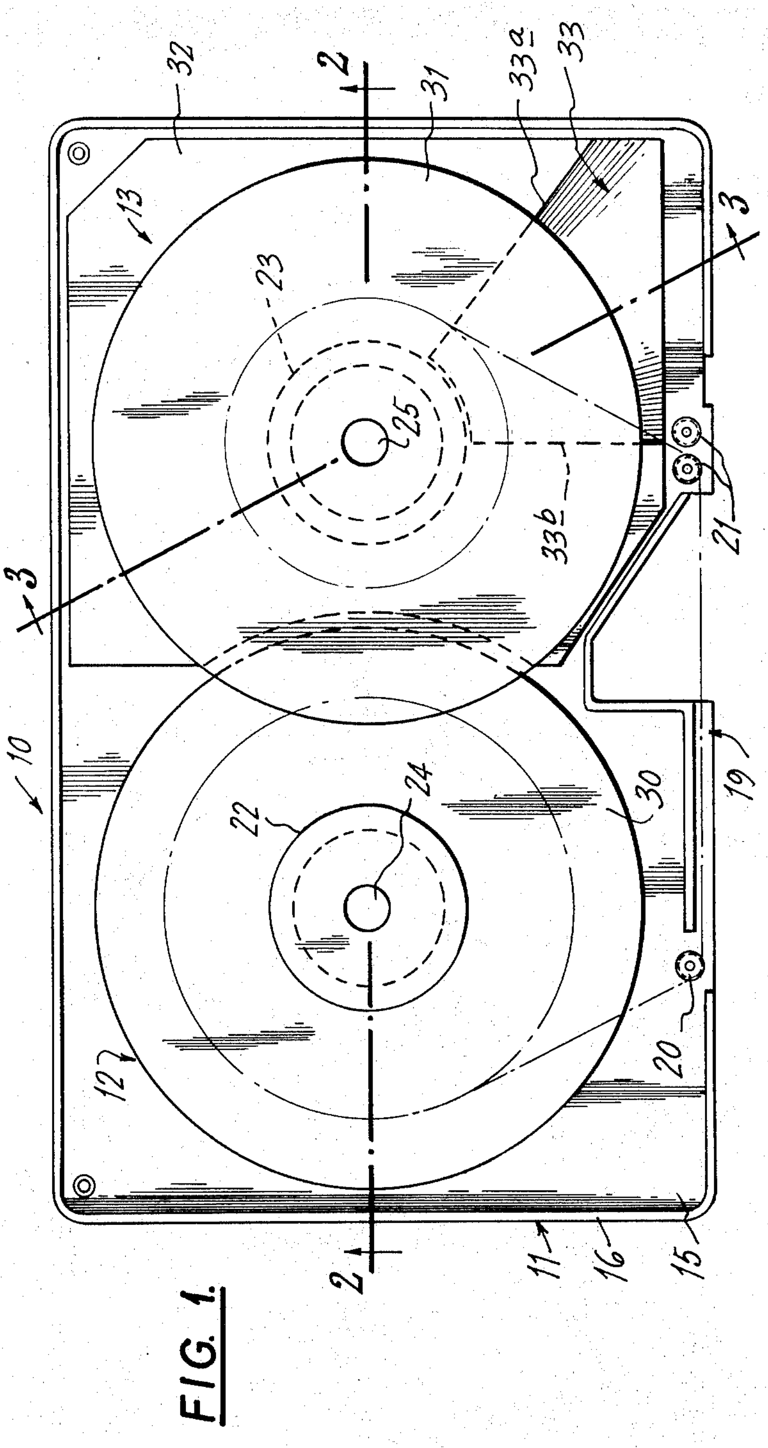
FIG. 1 is a top plan view of a magnetic tape cassette according to an embodiment of this invention which is shown with the top wall of its casing removed.
Figure 2:
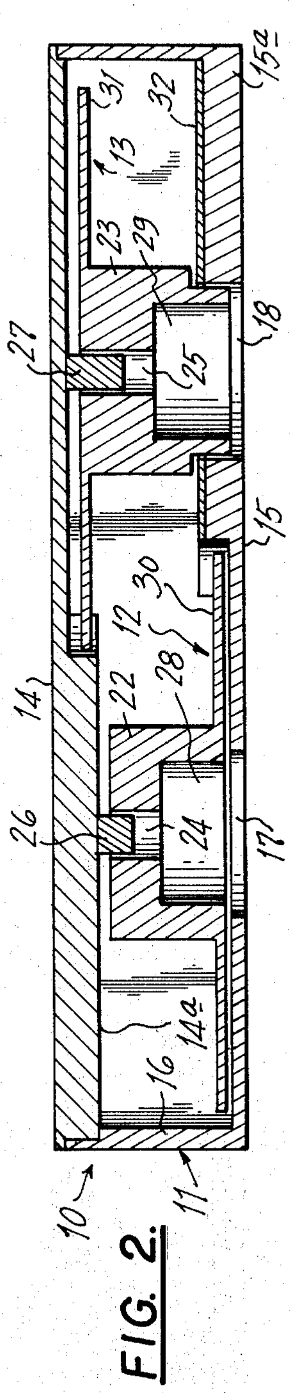
FIG. 2 is a longitudinal sectional view taken along the line 2—2 on FIG. 1.
Figure 3:
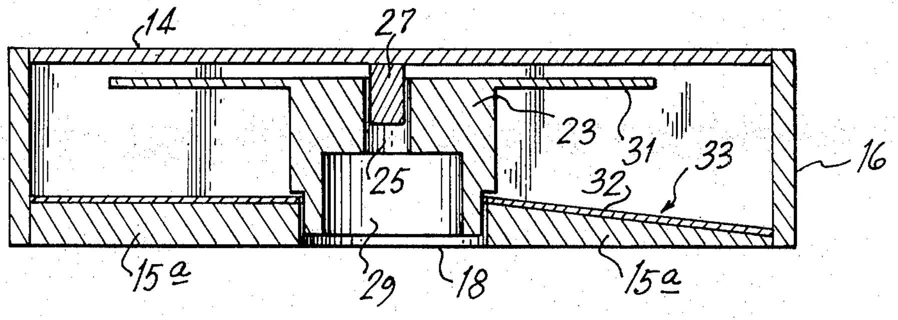
FIG. 3 is a sectional view taken along the line 3—3 on FIG. 1.

Referring to the drawings in detail, and initially to FIGS. 1 and 2 thereof, it will be seen that a magnetic tape cassette 10 according to this invention generally comprises a casing 11, and rotatable tape supply and take-up reels 12 and 13 which are disposed in side-by-side relation within casing 11.

Casing 11 is shown to include generally rectangular, parallely spaced apart top and bottom walls 14 and 15, and a side wall 16 extending between the top and bottom walls along a substantial portion of the casing perimeter. Bottom wall 15 is shown to have spaced apart apertures 17 and 18 therein (FIG. 2) for receiving the reel shafts (not shown) of a magnetic tape recording and/or reproducing apparatus with which the cassette 10 is to be used. An opening or gap 19 (FIG. 1) is provided in side wall 16 along one of the longitudinal edges of casing 11, and tape guide members or pins 20 and 21 extend between top and bottom walls 14 and 15 at spaced apart locations adjacent such gap 19 for guiding the tape T (shown in broken lines on FIG. 1) which is wound on reels 12 and 13 along a run which extends between reels 12 and 13 and is exposed at gap 19.

The supply and take-up reels 12 and 13 are respectively shown to include generally cylindrical hubs 22 and 23 having axial bores 24 and 25 opening at the upper ends of the respective hubs for loosely receiving pins or stub shafts 26 and 27, respectively, which depend from top wall 14 and may be formed integral with the latter. The bores 24 and 25 respectively cooperate with pins 26 and 27 to loosely hold reels 12 and 13 in alignment with apertures 17 and 18 in bottom wall 15 while permitting free rotation of the reels within casing 11. Further, reel hubs 22 and 23 are shown to have sockets 28 and 29, respectively, opening at the lower ends of the hubs to receive the previously mentioned reel shafts (not shown) when the latter extend into casing 11 through apertures 17 and 18. One of the tape reels, for example, the supply reel 12, has only a single flange 20 extending radially outward from the lower end of its hub 22 adjacent bottom wall 15, and the other tape reel, that is, the take-up reel 13, has only a single flange 31 extending radially outward from the upper end of its hub 23 adjacent top wall 14. By reason of such arrangement of the single flanges 30 and 31 of tape reels 12 and 13, the supply and take-up reels of cassette 10 can be laterally located, as by the pins 26 and 27, so as to have their respective flanges 30 and 31 in overlapping relation, as shown. The overlapping of flanges 30 and 31 makes it possible to reduce the lateral distance between the axes of rotation of reels 12 and 13, and thereby permits reduction in the overall lateral dimension of cassette casing 11 and a reduction in the size of the magnetic recording and/or reproducing apparatus with which the cassette 10 is to be used.

A layer 32 of a smooth low-friction material, for example, constituted by a sheet of polytetrafluoroethylene (available under the tradename Teflon) or the like, is shown to be adhered or otherwise applied to the upper surface of bottom wall 15 so as to cover an area of such upper surface of wall 15 which is at least substantially coextensive with the flange 31 provided at the upper end of hub 23 of take-up reel 13. Bottom wall 15 has a platform or raised portion 15*a* at the area of its upper surface covered by layer 32, that is, at least substantially coextensive with flange 31, so that, when cassette 10 is in use on a recording and/or reproducing apparatus, the level of low-friction layer 32 will substantially correspond to that of the upper surface of flange 30 on supply reel 12.

If desired, as particularly shown on FIG. 2, the lower surface of top wall 14 may be lowered, as indicated at 14*a*, at the area of top wall 14 which is substantially coextensive with flange 30 provided at the lower end of supply reel 12 so that, when cassette 10 is in use, such lowered surface portion of the top wall 14 at area 14*a* will be substantially at the same level as the undersurface of flange 31 of take-up reel 13.

It will be apparent that the magnetic tape originally wound on supply reel 12 rests on flange 30 at the bottom of such reel and, as the tape is wound onto take-up reel 13, such tape is guided accurately in the axial direction of reel 13, between low-friction layer 32 and flange 31 at the top of take-up reel 13 so as to be smoothly wound on the latter.

In accordance with the present invention, a depression 33 is formed in the top surface of raised portion 15*a* covered by low friction layer 32. The depression 33 extends over at least the range of the paths 34 and 35 of the tape T which extend from the adjacent tape guide members 21 tangentially to the outermost turn of the tape on hub 23 of reel 13 for the conditions of minimum winding and maximum winding, respectively, of the tape on such reel (FIG. 4). Thus, for all winding conditions of tape T on reel 13, the lower edge of the tape extending between tape guide members 21 and reel 13 is free of layer 32 on raised portion 15*a* of the casing bottom wall. It will be apparent that, by reason of the foregoing, a frictional drag is not applied to the lower edge of tape T between tape guide members 21 and reel 13 to avoid the previously mentioned disadvantages of such drag. Of course the turns of the tape T wound on hub 23 of reel 13 will continue to be guided accurately, in the axial direction of reel 13, between flange 31 and regions of low-friction layer 32 which lie outside the zone of raised portion 15*a* having the depression 33 therein. Where the turns of tape T wound on reel 13 are thus guided, the provision of the low-friction layer 32 on raised portion 15*a* will serve to minimize the friction resistance to rotation of reel 13.

The depression 33 may be bounded by margins 33*a* and 33*b* which extend substantially radially outward with respect to the axis of rotation of reel 13 from the edge of aperture 18, that is, adjacent the circumference of hub 23, to the periphery of raised portion 15*a* (FIG. 4). Further, as shown in FIGS. 5 and 6, the depth of depression 33 may increase gradually in the radially outward direction from the edge of aperture 18 to the periphery of raised portion 15*a* of bottom wall 15, and in the circumferential direction from margins 33*a* and 33*b* of depression 33 to the middle of the latter.

Since the tape T between reel 13 and tape guide members 21 is free of bottom wall 15 of the cassette casing, that is, there is no frictional drag on the lower edge of the tape, the normal forward movement of the tape and the winding thereof onto take-up reel 13, as during reproduction or playback of signals recorded on the tape, is accomplished without introducing vibrations into the tape. Thus, when the recorded signals are video signals, the reproduction of such signals is accomplished without imparting jitter to the corresponding pictures. Further, during the reverse movement of the tape, for example, during the usual high speed rewinding of the tape onto supply reel 12, depression 33 provided according to this invention again ensures that the lower edge of the tape will not be exposed to frictional drag between reel 13 and tape guide members 21, and thus will not have vibrations imparted to the tape that would interfere with the smooth high speed rewinding of the tape.

Although only the depression 33 has been described as being provided in the raised portion 15*a* of bottom wall 15 associated with take-up reel 13, a similar depression (not shown) may be provided in the undersurface of the portion 14*a* of top wall 14 to similarly avoid undesirable frictional drag on the adjacent edge of the tape extending between tape guide member 20 and reel 12, particularly, when the cassette is of the type that may be inserted or flipped-over, in which case the tape may be wound onto the reel 12 during recording or reproduction of signals on the tape, for example, as in multi-track tape cassettes.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed:

1. A magnetic tape cassette comprising a casing having spaced top and bottom walls and a side wall extending between said top and bottom walls along a substantial portion of the casing perimeter, first and second tape reels disposed within said casing for rotation in side-by-side relation to each other about respective axes which are substantially perpendicular to said bottom wall, each of said tape reels including a hub with a single flange extending radially therefrom at only one end of the respective hub, said first and second tape reels having said single flanges thereof at the ends of the respective hubs which are adjacent said top and bottom walls, respectively, of the casing, magnetic tape wound on the hubs of said reels and extending therebetween, the upper surface of said bottom wall having a raised portion which is at least substantially coextensive with said single flange of said first reel for cooperating with said single flange of the first reel in guiding the tape wound on said first reel in the axial direction of the latter, and at least one tape guide member disposed in said casing adjacent the periphery of said raised portion and being engageable by said tape between said reels for guiding the tape to and from said first reel, said raised portion of the bottom wall having a depression therein which is bounded by margins extending substantially radially outward from the hub of said first reel and which increases in depth in the radially outward direction from said hub of the first reel to said periphery of the raised portion, one of said radially extending margins being directed toward said tape guide member and the other of said radially extending margins being substantially along the loci of the points at which the paths of the tape extending from said tape guide member to the outermost turn of said tape on said first reel are tangential to said outermost turn for the conditions of maximum and minimum winding of the tape on said first reel, whereby said depression extends substantially only over the range of said paths followed by said tape between said tape guide member and said first reel in the winding and unwinding of the tape on said first reel.

2. A magnetic tape cassette according to claim 1, further comprising a layer of smooth low-friction material covering said raised portion of the bottom wall.

3. A magnetic tape cassette according to claim 1, in which said first and second tape reels are laterally located with respect to each other so that said flanges thereof are in overlapping relation.

* * * * *